US010261833B2

(12) United States Patent
Shakya et al.

(10) Patent No.: US 10,261,833 B2
(45) Date of Patent: Apr. 16, 2019

(54) SCHEDULING TASKS TO RESOURCES FOR A NETWORK USING FUZZY LOGIC

(71) Applicant: BRITISH TELECOMMUNICATIONS PUBLIC LIMITED COMPANY, London (GB)

(72) Inventors: Sid Shakya, London (GB); Anne Liret, London (GB); Gilbert Owusu, London (GB); Okung Ntofon, London (GB); Ahmed Mohamed, London (GB); Hani Hagras, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 140 days.

(21) Appl. No.: 15/316,407

(22) PCT Filed: Jun. 5, 2015

(86) PCT No.: PCT/GB2015/051644
§ 371 (c)(1),
(2) Date: Dec. 5, 2016

(87) PCT Pub. No.: WO2015/185938
PCT Pub. Date: Dec. 10, 2015

(65) Prior Publication Data
US 2017/0153925 A1    Jun. 1, 2017

(30) Foreign Application Priority Data
Jun. 5, 2014  (EP) .................................... 14250080

(51) Int. Cl.
*G06F 9/46* (2006.01)
*G06F 9/50* (2006.01)
(Continued)

(52) U.S. Cl.
CPC .......... *G06F 9/5038* (2013.01); *G06F 9/4881* (2013.01); *G06F 9/4887* (2013.01);
(Continued)

(58) Field of Classification Search
CPC .... G06F 9/5038; G06F 9/4881; G06F 9/4887; G06Q 10/06; G06Q 10/06314; H04L 67/322
See application file for complete search history.

(56) References Cited

U.S. PATENT DOCUMENTS

| 7,996,842 B2 * | 8/2011 | Savit ....................... G06F 9/505 718/103 |
| 2009/0089092 A1 | 4/2009 | Johnson et al. |
| 2009/0199192 A1 | 8/2009 | Laithwaite et al. |

FOREIGN PATENT DOCUMENTS

DE    102013008151 A1 *  11/2014 ............. G06N 5/048

OTHER PUBLICATIONS

International Search Report for PCT/GB2015/051644, dated Jul. 13, 2015 (3 pages).

* cited by examiner

*Primary Examiner* — Bing Zhao
(74) *Attorney, Agent, or Firm* — Nixon & Vanderhye P.C.

(57) ABSTRACT

The present invention provides a method which can be used to optimise the delivery of series over communications networks. Tasks which need to executed within a short timescale and those which are not due to be executed for a long time are excluded from the optimisation process. A score is determined, using fuzzy logic, for each task and its related resources and for each resource and its related tasks. This score is then used to determined which tasks should be optimised.

12 Claims, 6 Drawing Sheets

(51) Int. Cl.
*G06Q 10/06* (2012.01)
*H04L 29/08* (2006.01)
*G06F 9/48* (2006.01)

(52) U.S. Cl.
CPC ....... *G06Q 10/06* (2013.01); *G06Q 10/06314* (2013.01); *H04L 67/322* (2013.01)

SCHEDULING TASKS TO RESOURCES FOR A NETWORK USING FUZZY LOGIC

This application is the U.S. national phase of International Application No. PCT/GB2015/051644 filed Jun. 5, 2015, which designated the U.S. and claims priority to Ep Patent Application No. 14250080.0 filed Jun. 5, 2014, the entire contents of which are hereby incorporated by reference.

BACKGROUND AND SUMMARY

The present invention relates to a method of scheduling resources and in particular scheduling access to resources for the efficient utilisation of network capacity and network infrastructure.

The deployment of dedicated high performance networked infrastructure for high-end applications and services such as e-health, e-commerce, digital cinema, scientific visualization, and big data analysis requires mechanisms which ensure effective and efficient use of available resources such as processing power, data storage, and network capacity. Key to achieving this is the development and deployment of intelligent request scheduling and service provisioning within the network infrastructure.

FIG. 1 shows a schematic depiction of an architecture of a such a high-performance communications network 100. The communications network 100 comprises: network controller 110, data centre 120, a plurality of network nodes 130a, 130b, . . . , 130f and first and second network users 140a, 140b. The plurality of network nodes 130a, 130b, . . . , 130f are interconnected by a plurality of communications links 150 and the data centre 120 and the first and second network users 140a, 140b are each connected to one of the plurality of network nodes by a respective communication link 150. The plurality of communications links 150 can be configured dynamically to provide high quality of service (QoS) networked services for scheduled requests. The network controller 110 receives requests for scheduling from users and will grant or refuse these requests in accordance with the availability of the requested network resources. The network controller also comprises an integrated control plane for service provisioning across the plurality of network nodes and communications links.

Such architectures are becoming popular with the emergence of technological approaches such as Software Defined Networking (SDN) which promote the existence of logically centralized network control functionalities which dynamically program the forwarding plane of network devices (see, for example, "*Software-Defined Networking: The New Norm for Networks*", Open Networking Foundation, ONF White Paper, 2012). Such scenarios focus on high-end applications which require network capacities that preclude traditional public networks and instead require the use of dedicated networked infrastructures. For example, the networked distribution of ultra-high-definition video and big data datasets (e.g. financial market datasets) have bandwidth requirements ranging from hundreds of megabits per second (Mb/s) up to terabits per second (Tb/s) for a single request (see A. Jukan & J. Mambretti, "*Evolution of Optical Networking Toward Rich Digital Media Services*", Proceedings of IEEE, Vol. 100 Issue 4, 2012).

Table 1 below shows a number of requests which may be made of the network discussed above with reference to FIG. 1 from digital cinema clients and bank data archiving applications. The network infrastructure controller takes into consideration resource requirements such as bandwidth, which is a capacity constraint, as well as service delivery times when scheduling requests. For digital cinema clients i.e. cinema theatres, requests are usually known in advance and a schedule can be computed statically. Bank data archiving could also be performed routinely at predetermined times and thus can also be scheduled statically.

TABLE 1

Requests for networked services

| Client | Bandwidth Requirement | Timeslot |
|---|---|---|
| Digital Cinema - Movie A | 250 Mb/s | T1 |
| Digital Cinema - Movie B | 250 Mb/s | T1 |
| Digital Cinema - Movie C | 400 Mb/s | T2 |
| Bank - Routine Archiving | 100 Mb/s | T1-T2 |

FIG. 2 shows a graphical depiction of a schedule timeline, which can be derived from the scheduling of requests shown in Table 1 above. This assumes the scheduling algorithm aims to achieve multiple objectives including:
  (i) maximizing the number of accepted requests with sufficient end-to-end bandwidth, and
  (ii) minimizing the number of network links used to interconnect the service provider's data centre with clients for accepted requests.

However, it will be understood that all not all uses of the network can be scheduled in such a predetermined or static manner. Consider the case where a critical threat to the banking system requires the immediate real time remote storage of large datasets with the requirement presented in Table 2 below.

TABLE 2

Further request for networked services

| Client | Bandwidth Requirement | Timeslot |
|---|---|---|
| Bank - Critical Archiving | 750 Mb/s | T2 |

FIG. 3 shows a graphical depiction of the schedule timeline of FIG. 2 which has been modified to incorporate the further request shown above in Table 1. This schedule will cause the network to have insufficient capacity to transport this dataset across the networked infrastructure with high enough QoS for remote storage at networked storage facility 160. Therefore a reactive scheduler is required to reshuffle the scheduled tasks which fall within the same timeslot as the real time critical bank data archiving request.

A schedule is the ordering of requests into time sequences with a corresponding selection of resources required to execute or implement the requests. The execution of a schedule results in the delivery of services to clients systems over a specified time horizon. Scheduling problems can be divided into two categories: static scheduling, where requests are submitted in advance, and dynamic scheduling, in which requests arrive in real time. Static scheduling is typically preformed in environments where time constraints are not critical and a full optimisation can be performed to deliver an optimal schedule. Such scenarios mainly apply to start of the day scheduling which takes into account the requests from previous days that are already in the pipeline. The execution time for a static scheduler can range from a few minutes to few hours while taking into consideration a wide range of constraints and optimisation goals. However, such approaches are not valid in an environment where time is critical and a schedule has to be prepared as and when requests arrive in real time. A real time scheduler allows decisions to be made quickly and optimally, allowing time critical decisions to happen with very little manual intervention.

US2009/0089092 discloses a method of scheduling resources used in delivering healthcare services to a series of patients. The method identifies the availability of a series of resources used to deliver the healthcare; calculates a schedule including a block of time dependent on the predicted duration for each resource to deliver healthcare; calculates a confidence level in the schedule, the confidence level including a probability that one or more of the resources will not be available; and outputs the schedule and the confidence level in the schedule for display.

According to a first aspect of the present there is provided a method of scheduling a plurality of tasks to one or more of a plurality of resources such that the tasks can be executed, the method comprising the steps of: a) in a first phase of the method, assigning one or more tasks when the task is received to one or more of the plurality of resources for execution at a pre-determined time; b) in a second phase of the method, i) monitoring each of the plurality of resources to determine the likelihood that each of the tasks can be executed; ii) if the likelihood that a task cannot be executed is greater than a predetermined threshold, reassigning the task to one or more further resources such that there is a sufficient likelihood that the task can be executed at the pre-determined time by the one or more further resources; and c) in a third phase of the method, optimising the scheduling of one or more of the tasks, characterised in that the third phase comprises: for each task calculating a score using a first fuzzy logic function and deciding whether to select a task for optimisation in accordance with the calculated score, for the one or more tasks selected for optimisation using a second fuzzy logic function to optimise the allocation of the selected tasks to the plurality of resources.

The optimisation of the allocation of the selected tasks to the plurality of resources may comprise the allocation of a selected task from a first resource to a second resource. Alternatively, the optimisation of the allocation of the selected tasks to the plurality of resources may comprise the allocation of a selected task from a first timeslot to a second timeslot. This may involve swapping a first selected task with a second selected task, the first and second tasks being scheduled to be executed in different timeslots.

The present invention provides a scheduling method without a strict separation between predictive and reactive scheduling processes. It exposes configurable drivers sent to the engine to facilitate dynamic handling of task and/or resource assignments depending on current time.

According to a second aspect of the present invention there is provided a data carrier device comprising computer executable code for performing a method as described above.

According to a third aspect of the present invention there is provided an apparatus configured to, in use, perform a method as described above.

BRIEF DISCRIPTION OF THE DRAWINGS

Embodiments of the present invention will now be described, by way of example only, with reference to the accompanying drawings in which.

DETAILED DESCRIPTION OF THE PRESENT EXAMPLE EMBODIMENTS

The scheduling process described below comprises three different phases. The first phase is a reactive phase in which new requests are allocated to the most appropriate resource as they are received.

The second phase of the scheduling process comprises a proactive phase in which the schedule for each resource is monitored. If it can be predicted that a task is likely to fail, that is that the probability that the task can be successfully implemented using the resources which were allocated to it in the first phase (see above) falls below a threshold value, then that task will be disassociated from the resource which had been allocated to the execution of the task. The task will then be re-allocated to a further resource (or resources) for which it can be determined that the further resource will have sufficient capabilities to deliver the service(s) required for the task.

The final phase of the scheduling process is an optimisation phase. The optimisation phase will periodically attempt to optimise the schedule. The optimisation process involves taking a portion of the schedule and optimising that portion of the schedule. The optimisation may comprise changing a scheduled request from a first timeslot in the schedule to a second timeslot in the schedule. Alternatively, optimisation may comprise allocating a request from a first resource to a second resource without changing the timeslot within which the request is to be executed. These combinations make the system very effective in optimizing the schedule in real time.

Figure 4:
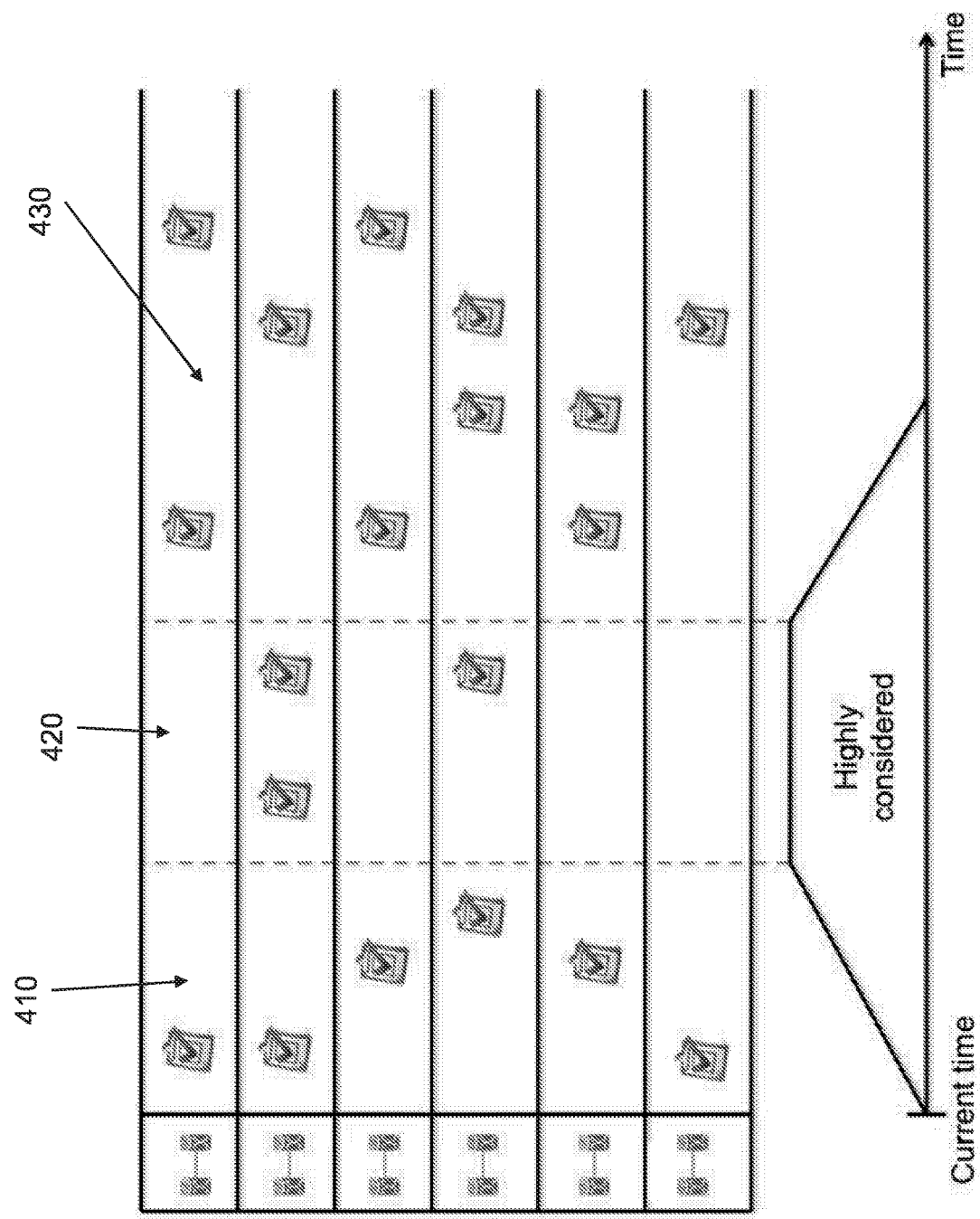
FIG. 4 shows a graphical depiction of these three stages within schedule timeline.

The optimisation phase itself comprises three different stages FIG. 4 shows a graphical depiction of these three stages within the schedule timeline. In the first stage 410 the tasks that are scheduled to be executed in the near future have a low probability of being optimised, as it is likely that there will be insufficient time to complete the optimisation process before the task needs to be executed. The second stage 420 defines a time window within which there is a greater likelihood that a task will be considered for optimisation. The third stage 430 comprises tasks that have a relatively long period of time until they will be executed: these tasks have a relatively low probability of being optimised. There is little point in optimising many of the tasks in stage 430 as they may need to be subsequently re-optimised in stage 420 as the available resources change or further tasks are scheduled for execution.

As the tasks shown in FIG. 4 effectively move from right to left as the time remaining before their execution decreases, many of the tasks will progress from stage 430 to stage 420, and thence to stage 410. Thus, only tasks which are scheduled such they go straight into stage 410 (i.e. the tasks are scheduled very close to execution time) will avoid the second stage where most optimisation occurs.

The optimisation phase of the scheduling process is performed on a periodic basis, for example once a day (although it will be understood that the frequency with which the optimisation phase is performed will need to be determined in accordance with the requirements of the process that is being scheduled). The relative widths of the first, second and third stages are not fixed but are determined automatically, preferably using a fuzzy logic-based approach. The widths of the stages can change over time in accordance with the number of scheduled tasks, task density, etc. The determination of the widths of the first, second and third stages can be reduced to the determination of the start point and the end point of the second stage.

Furthermore, within the second stage of the optimisation phase, not all tasks will necessarily be considered for optimisation. If tasks are to be re-optimised in real time then the search space needs to be shortened so as to cover the most promising portion of the second stage. A fuzzy logic system is used with inputs based on a number of the following constraints:

Task duration
remaining time until the task is to be executed
task priorities, and
available resource density (for example, the number of available network links and/or available computing resources).

The values of these inputs can be processed to provide a score which can be used to determine which of the tasks should be optimised by re-allocating them to different resources for execution or by changing the timeslot in which the task is executed. This approach enables the optimisation, repair or maintenance of a schedule in real time, that is during execution of scheduled requests.

Figure 1:
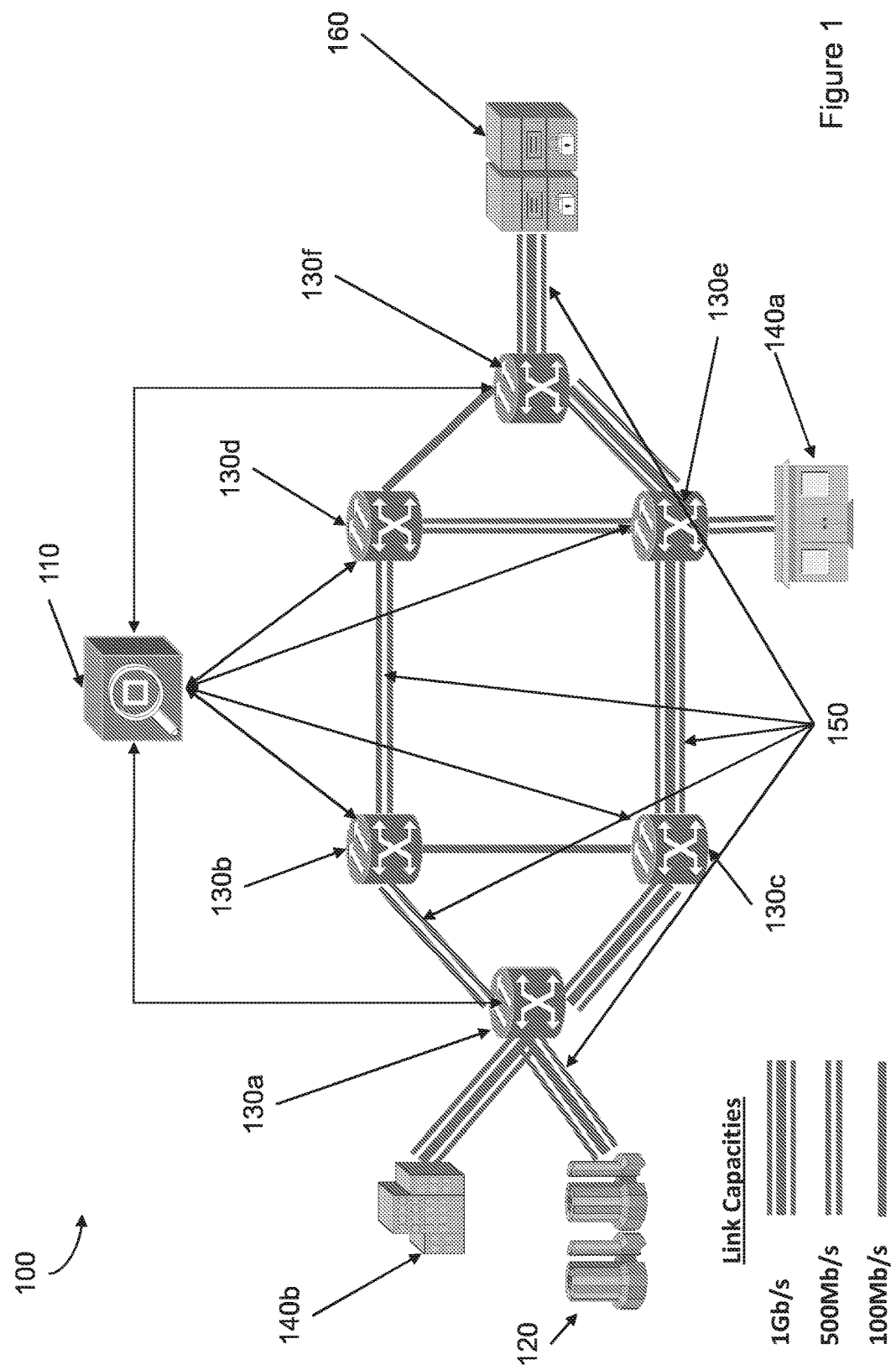
FIG. 1 shows a schematic depiction of an architecture of a high-performance communications network
Figure 2:
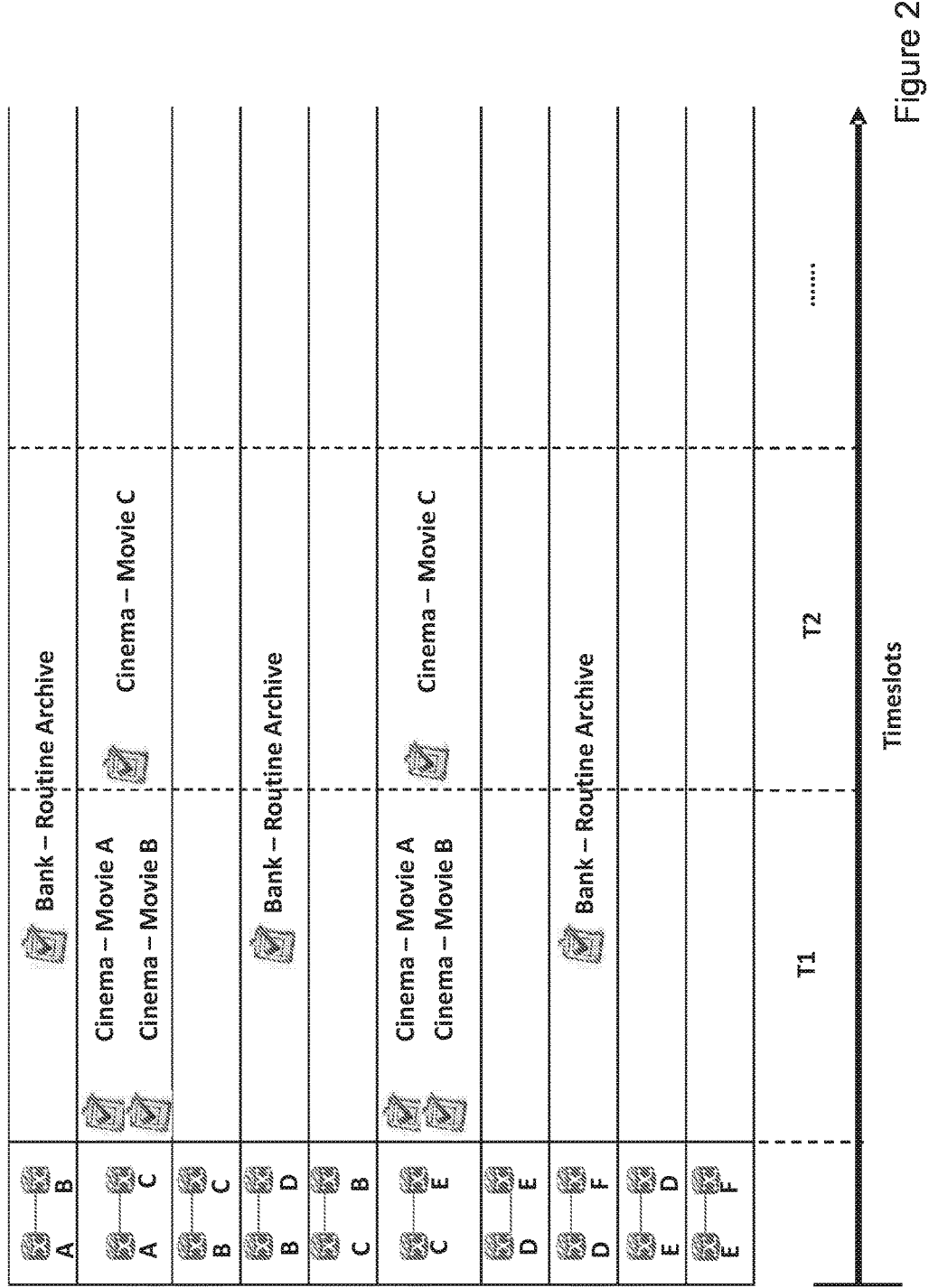
FIG. 2 shows a graphical depiction of a schedule timeline.
Figure 3:
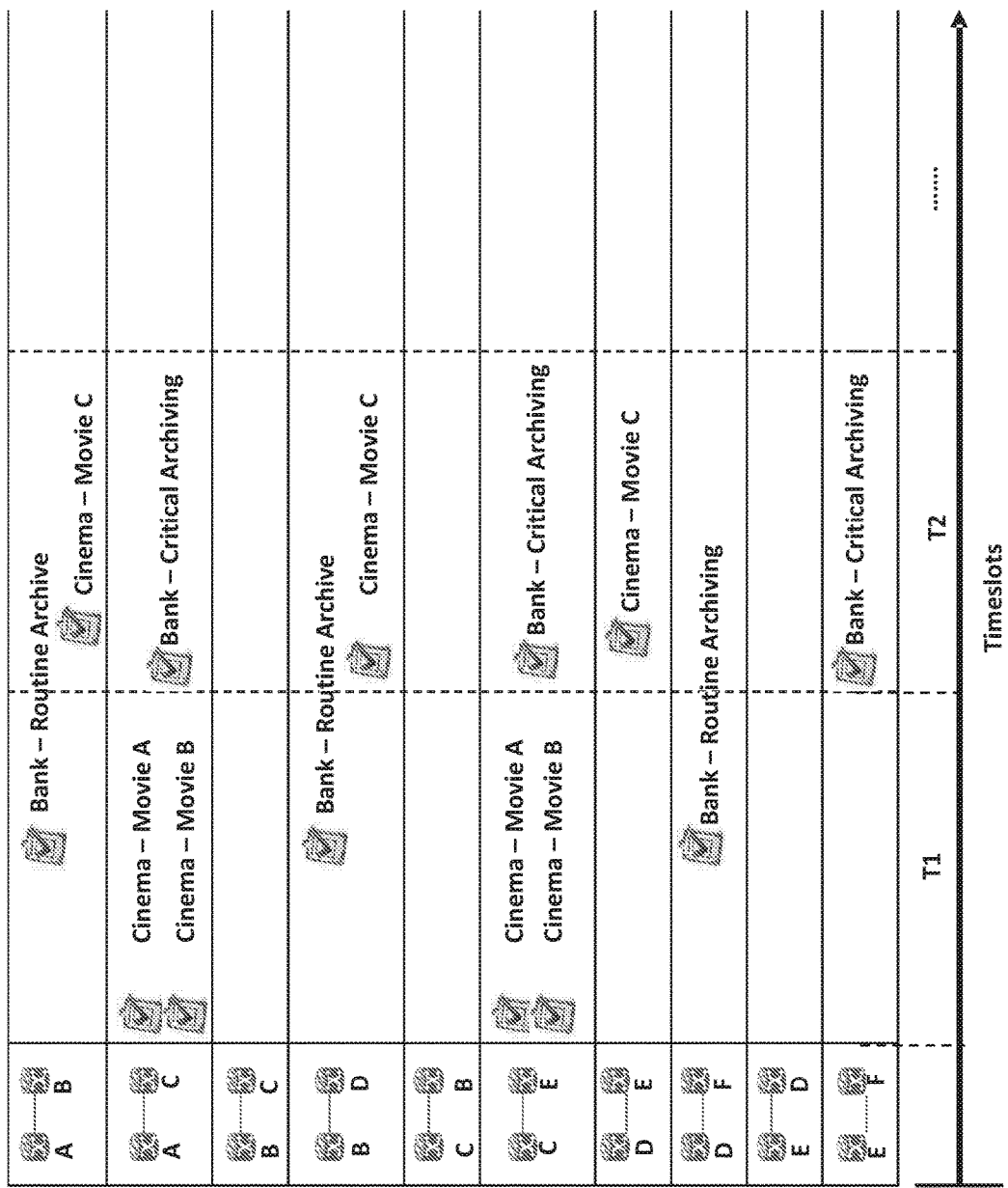
FIG. 3 shows a graphical depiction of the schedule timeline of FIG. 2 which has been modified.

FIG. 4 shows a graphical depiction of a schedule that needs to be optimised. The execution of the schedule corresponds to the effective delivery of networked services comprising computing services and the provisioning of network links to interconnect customers with service providers for the distribution of network traffic, in a manner similar to that described above with reference to FIG. 1. Estimated task assignments are forwarded to resources which then execute the tasks. Ideally, the estimated start and completion times, which constitute the estimated schedule, become release dates at the schedule execution, progressively constituting the "actual" schedule. The schedule involves current time, task and resource variable statuses that are tracked through the execution progress.

Tasks whose completion time are close to the current time won't be included in the optimisation phase so that the resources which are already working on some of the tasks as well as the customers waiting for the immediate tasks to be completed are not obstructed. Tasks with completion time far from the current time won't be included as well to prevent the computational expense of running the scheduler. The approach selects just a segment of this schedule to optimize; this segment constantly shifts with time and constantly optimizes the future tasks, i.e. those within the second stage 420.

The definition of the limits which define the second stage is constrained by current time, parameters such as short term offset for user (i.e. the forward visibility when doing on the fly allocation), and past and executing tasks. This can be defined by a constraint propagation set. Depending on the type of event occurring, the constraints propagation will move the window or shorten (or not) the set of considered resources for the next real time allocation demand.

The tasks need to be considered within the second stage when re-computing the schedule. The problem to solve is: having a status for each task with a different importance, completion time and failure penalty, how can we know if it will be taken into consideration in the new schedule or not? A fuzzy system is used to compute a score so that tasks with score 0 are not taken into consideration and task with score 1 are processed for scheduling. The score is assigned to each task depending on the previously computed schedule, on the executing part of the schedule and the remaining time to the execution time of the tasks. So for each time instance, a score is associated to the task and used by the system to select only tasks that need to be moved.

Figure 5:
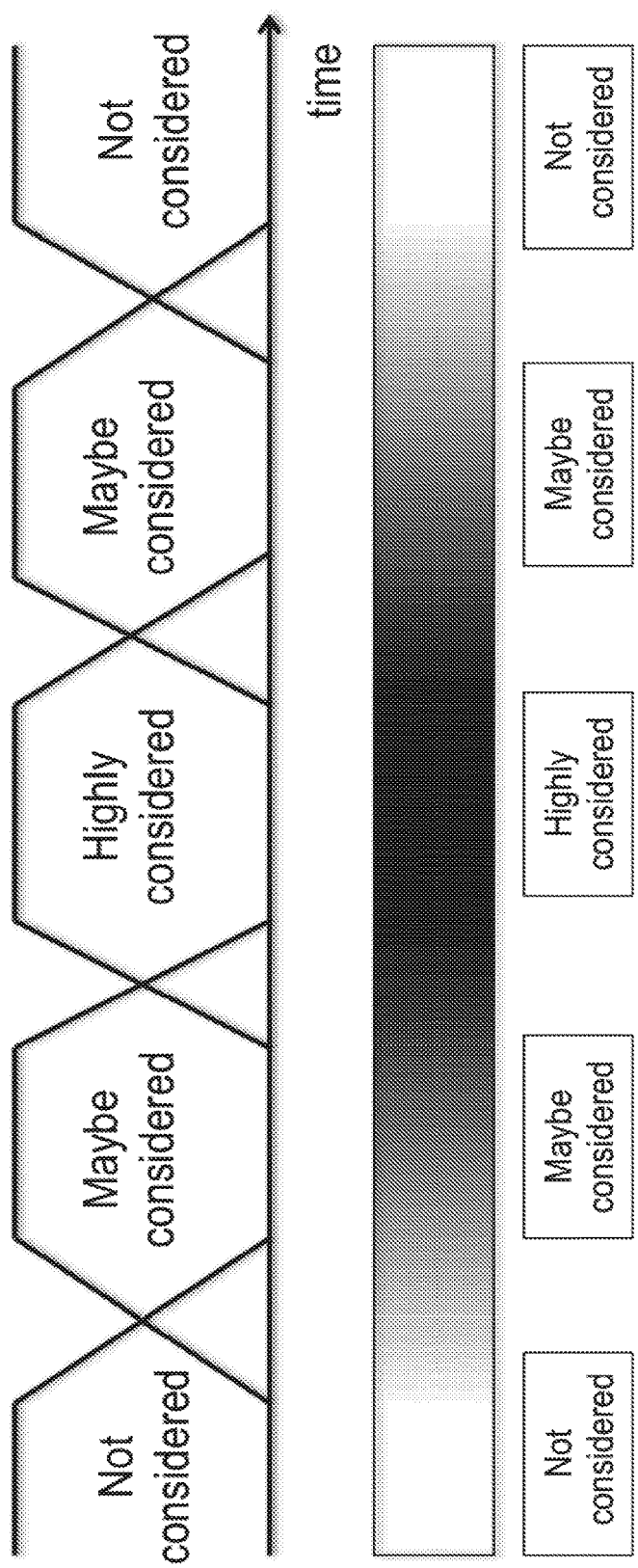
FIG. 5 shows a graphical depiction of the concept of fuzzy period implemented in the present invention.

FIG. 5 shows a graphical depiction of the concept of fuzzy period which is implemented in the present invention: If the task is in the black area that means it is highly considered for rescheduling. If it is in the grey area that means it might be considered for rescheduling, else if it is in the white area then it is not considered at all for rescheduling. FIG. 5 only uses the remaining time before having to execute the task as an input but it will be appreciated that this can be easily extended to include other inputs, such as task importance, task density, the maximum number of hops to interconnect source and destination nodes, etc.

Figure 6:
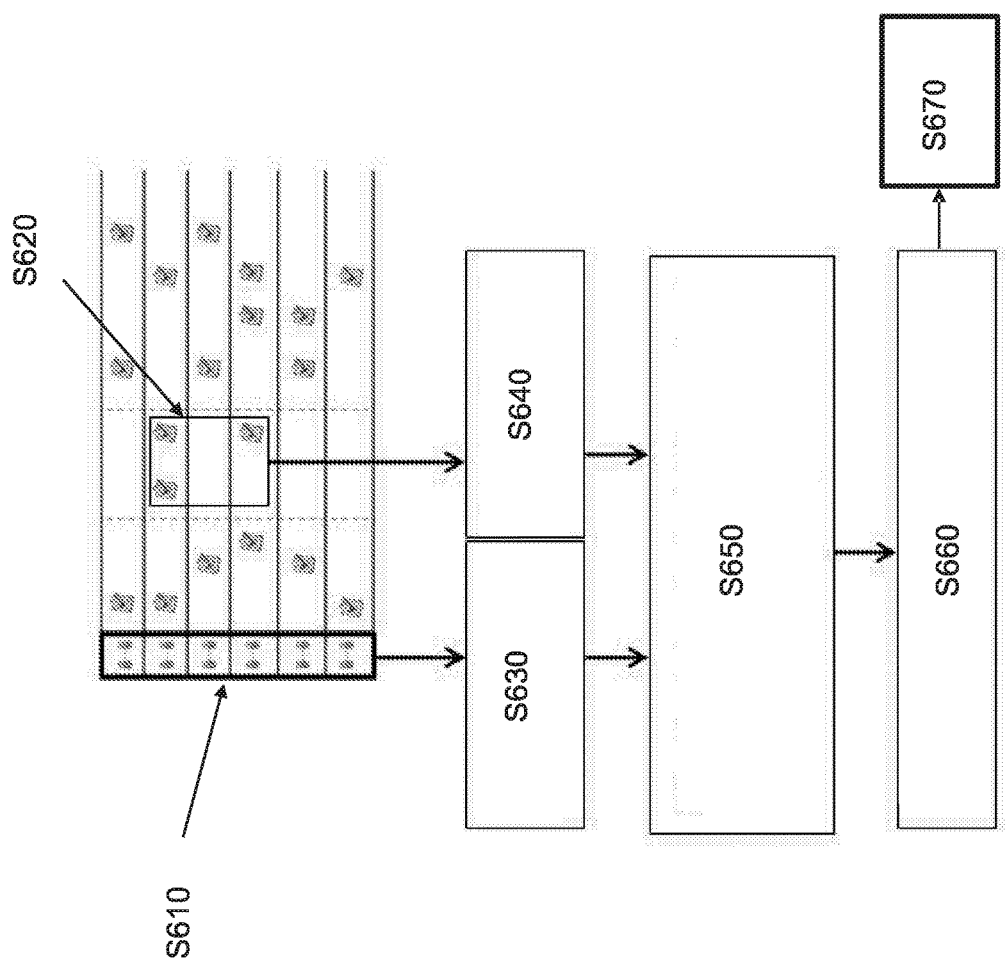
FIG. 6 shows a schematic depiction of the operation of the optimisation phase of the scheduling method in more detail.

FIG. 6 shows a schematic depiction of the operation of the optimisation phase of the scheduling method in more detail. The optimisation process is performed for a high-end networked infrastructure similar to that described above with reference to FIG. 1.

The first step of the optimisation phase S610 is to group all of the resources that will be available and at step S620 identify all of the tasks in the second stage which have been considered as being appropriate for optimisation. Then, at S630, for each of the considered tasks, add the compatible resources to its list of compatible resources. Similarly, at S640, for each of the resources, add the compatible tasks to its list of compatible tasks.

At step S650, a score is calculated using a fuzzy logic system between each of the resource and its compatible tasks and between each of the considered tasks and its compatible resources using predefined inputs.

These predefined inputs may include:

distance: The closer the distance, the higher the score. The distance may be the number of nodes or network links composing the path to destination time difference: If the task lies in the dark area in FIG. 6, the score will be higher, whereas if it is in the grey area then it will be lower.

task importance: The higher the importance, the higher the score.

task density: The higher the task density at destination or a particular node, the higher the score.

resource preference: the tasks with the characteristics closely matching available resource capabilities will have a higher score. For example, tasks with bandwidth requirements that can be delivered by the capacity of available links will have a higher score.

Expected time left for going through a network path: the lower the time (with respect to the number of links and available bandwidth), the higher the score so we can utilize the resources as much as possible.

At step S660, the best available resource for each task is assigned in accordance with the scores calculated in S650. Finally, at step S670, heuristics are applied to determine if some of the tasks can be moved. Two types of move are contemplated. Firstly, a swap between two tasks already in the schedule but to resources that may not be the best adapted ones anymore. Secondly, the relocation of a task to another resource by inserting the task after another activity and removing the task from the work sequence of another resource, because the latter may not be available anymore or not able to complete the task on time.

TABLE 3

Exemplary task parameter values

| Task | Distance | Time difference | Task density | Resource preference | Expected time left | Importance | Score |
|---|---|---|---|---|---|---|---|
| Task 1 | 10 | 0 | 90 | 1 | 1 | 900 | 82.5 |
| Task 2 | 50 | 10 | 20 | 3 | 3 | 500 | 39.4 |
| Task 3 | 100 | 60 | 0 | 9 | 10 | 100 | 7.5 |

Table 3 comprises parameter values relating to three compatible tasks to a resource and their compatibility scores. The minimum parameter value for a is 0 and the maximum parameter value is 100.

For example in case of task 1, the following pre-defined fuzzy rules were fired (The notion of values being Low, Medium and High comes from the fuzzy sets defined against each variable, so that each value can be Low and Medium but with certain strength. The strength of the values is used to calculate the firing strength of each rule).

1. IF Distance is Low and IF Resource preference is Low Then Score is veryHigh. Firing Strength: 0.8
2. IF Distance is Medium and IF Resource preference is Low Then Score is High. Firing Strength: 0.2
3. IF Distance is Low and IF Importance is Medium Then Score is High. Firing Strength: 0.2
4. IF Distance is Low and IF Importance is High Then Score is veryHigh. Firing Strength: 0.6
5. IF Distance is Medium and IF Importance is Medium Then Score is Medium. Firing Strength: 0.05
6. IF Distance is Medium and IF Importance is High Then Score is High. Firing Strength: 0.15
7. IF Distance is Low and IF Tasks density is High Then Score is veryHigh. Firing Strength: 0.8
8. IF Distance is Medium and IF Tasks density is High Then Score is High. Firing Strength: 0.2
9. IF Distance is Low and IF Expected time left is Medium Then Score is High. Firing Strength: 0.76
10. IF Distance is Low and IF Expected time left is High Then Score is veryHigh. Firing Strength: 0.04
11. IF Distance is Medium and IF Expected time left is Medium Then Score is Medium. Firing Strength: 0.19
12. IF Distance is Medium and IF Expected time left is High Then Score is High. Firing Strength: 0.01
13. IF Distance is Low and IF Time difference is Medium Then Score is veryHigh. Firing Strength: 0.8
14. IF Distance is Medium and IF Time difference is Medium Then Score is Medium. Firing Strength: 0.2

Then an overall defuzzification using the centre of sets defuzzification is performed to calculate the final output, as shown in equation[1] below;

$$y(x) = \frac{\sum_{l=1}^{M} y^{-l} w^l}{\sum_{l=1}^{M} w^l} \quad [1]$$

Where M is the total number of fired rules, $y^{-l}$ is the center of gravity of the output set of the $l^{th}$ rule and $w^l$ is the firing strength of the $l^{th}$ rule irrespective, which the fuzzy logic system is firing this given rule. The crisp output of the fuzzy system represents the compatibility score between a given task and a given resource.

The approach mixes Heuristic Search (HS) methods and a Fuzzy Logic system. It removes the objective function that traditionally is used by HS to evaluate a solution and replaces the evaluation of the solution with the operation of a fuzzy rules based system. The HS method optimizes the schedule after the fuzzy system has selected the best resource to allocate to a given task. In the case where a task is likely to fail, this is detected by comparing the task expected start time, the current time, and for a network use-case, the interconnectivity that must exist between source and destination nodes. The efficiency of the mechanism relies on how far in advance and accurately the risk of task failure can be detected.

The optimisation system is applied to an existing schedule and performs swaps of future tasks between different timeslots and reallocation of tasks to resources. The use of heuristics is particularly relevant in the context where the schedule is subject to frequent disturbances (the best solution is less important because it may not remain optimal or even valid for a long time). The output of this process is that the schedule is periodically optimised in real time so the utilization of the resources is maximized and the execution of requests is optimised.

It will be understood that the scheduling method of the present invention may be implemented by executing computer code on a general purpose computing apparatus. It should be understood that the structure of the general purpose computing apparatus is not critical as long as it is capable of executing the computer code which performs a method according to the present invention. Such computer code may be deployed to such a general purpose computing apparatus via download, for example via the internet, or on some physical media, for example, DVD, CD-ROM, USB memory stick, etc. It will be understood that the preceding discussion has been focused on the use of the present invention in the context of optimising requests to use network resources. It will be appreciated by those skilled in the art that the method of the present invention could be applied to other scenarios in which tasks need to be scheduled for execution, for example switching and routing in communications networks or devices, etc.

In one aspect, the present invention provides present invention provides a method which can be used to optimise the delivery of series over communications networks. Tasks which need to executed within a short timescale and those which are not due to be executed for a long time are excluded from the optimisation process. A score is determined, using fuzzy logic, for each task and its related resources and for each resource and its related tasks. This score is then used to determined which tasks should be optimised.

The invention claimed is:

1. A method of scheduling a plurality of tasks to one or more of a plurality of resources such that the tasks can be executed, the method comprising the steps of:
   a) in a first phase of the method, assigning one or more tasks when the task is received to one or more of the plurality of resources for execution at a predetermined time;
   b) in a second phase of the method performed after the first phase,
      i) monitoring each of the plurality of resources to determine the likelihood that each of the tasks can be executed;
      ii) if the likelihood that a task cannot be executed is greater than a predetermined threshold, reassigning the task to one or more further resources such that there is a sufficient likelihood that the task can be executed at the pre-determined time by the one or more further resources; and c) in a third phase of the method performed after the second phase, optimising the scheduling of one or more of the tasks, wherein the third phase comprises:

defining a first time period, a second time period and a third time period in sequential order such that any task in the first time period is scheduled for completion closer to a current time than any task scheduled in the second time period, and any task in the third time period is scheduled for completion farther from the current time than any task scheduled in the second time period, applying a first fuzzy logic function to determine a first score for each task scheduled in the second time period and excluding application of the first fuzzy logic function to any task scheduled in the first and third time periods;

selecting one or more of the tasks scheduled in the second time period in accordance with the first score; and for the one or more selected tasks, using a second fuzzy logic function to calculate a second score, and optimizing the allocation of the selected tasks to the plurality of resources in accordance with the second score.

2. A method according to claim 1, wherein the optimisation of the allocation of the selected tasks to the plurality of resources comprises the allocation of a selected task from a first resource to a second resource.

3. A method according to claim 1, wherein the optimisation of the allocation of the selected tasks to the plurality of resources comprises the allocation of a selected task from a first timeslot to a second timeslot.

4. A method according to claim 3, wherein the optimisation of the allocation of the selected tasks to the plurality of resources comprises swapping a first selected task with a second selected task, the first and second tasks being scheduled to be executed in different timeslots.

5. The method according to claim 1, wherein relative time widths of the first, second and third time periods are variable.

6. The method according to claim 1, wherein relative time widths of the first, second and third time periods are variable and determined using a fuzzy logic based approach.

7. A non-transitory storage medium storing computer executable code for performing, upon execution by a computer system, a method of scheduling a plurality of tasks to one or more of a plurality of resources such that the tasks can be executed, the method comprising:

a) in a first phase of the method, assigning one or more tasks when the task is received to one or more of the plurality of resources for execution at a predetermined time;

b) in a second phase of the method performed after the first phase, i) monitoring each of the plurality of resources to determine the likelihood that each of the tasks can be executed;

ii) if the likelihood that a task cannot be executed is greater than a predetermined threshold, reassigning the task to one or more further resources such that there is a sufficient likelihood that the task can be executed at the pre-determined time by the one or more further resources; and c) in a third phase of the method performed after the second phase, optimising the scheduling of one or more of the tasks, wherein the third phase comprises:

defining a first time period, a second time period and a third time period in sequential order such that any task in the first time period is scheduled for completion closer to a current time than any task scheduled in the second time period, and any task in the third time period is scheduled for completion farther from the current time than any task scheduled in the second time period, applying a first fuzzy logic function to determine a first score for each task scheduled in the second time period and excluding application of the first fuzzy logic function to any task scheduled in the first and third time periods;

selecting one or more of the tasks scheduled in the second time period in accordance with the first score;

for the one or more selected tasks, using a second fuzzy logic function to calculate a second score, and optimizing the allocation of the selected tasks to the plurality of resources in accordance with the second score.

8. The non-transitory storage medium according to claim 7, wherein relative time widths of the first, second and third time periods are variable.

9. The non-transitory storage medium according to claim 7, wherein relative time widths of the first, second and third time periods are variable and determined using a fuzzy logic based approach.

10. An apparatus comprising a non-transitory storage medium storing computer executable code and a computer processing device configured to execute the computer executable code so that the apparatus is at least configured to perform, for scheduling a plurality of tasks to one or more of a plurality of resources such that the tasks can be executed:

a) in a first phase, assign one or more tasks when the task is received to one or more of the plurality of resources for execution at a predetermined time;

b) in a second phase performed after the first phase, i) monitor each of the plurality of resources to determine the likelihood that each of the tasks can be executed;

ii) if the likelihood that a task cannot be executed is greater than a predetermined threshold, reassign the task to one or more further resources such that there is a sufficient likelihood that the task can be executed at the pre-determined time by the one or more further resources; and c) in a third phase performed after the second phase, optimize the scheduling of one or more of the tasks, by:

defining a first time period, a second time period and a third time period in sequential order such that any task in the first time period is scheduled for completion closer to a current time than any task scheduled in the second time period, and any task in the third time period is scheduled for completion farther from the current time than any task scheduled in the second time period, and applying a first fuzzy logic function to determine a first score for each task scheduled in the second time period and excluding application of the first fuzzy logic function to any task scheduled in the first and third time periods;

selecting one or more of the tasks scheduled in the second time period in accordance with the first score; and for the one or more selected tasks, using a second fuzzy logic function to calculate a second score, and optimizing the allocation of the selected tasks to the plurality of resources in accordance with the second score.

11. The apparatus according to claim 10, wherein relative time widths of the first, second and third time periods are variable.

12. The apparatus according to claim 10, wherein relative time widths of the first, second and third time periods are variable and determined using a fuzzy logic based approach.

\* \* \* \* \*